United States Patent [19]

Ikishima

[11] Patent Number: 4,556,379
[45] Date of Patent: Dec. 3, 1985

[54] SUSHI SHAPING APPARATUS

[76] Inventor: Toshimasa Ikishima, 1-1, Komatsu 2-chome, Tsuchiura-shi, Ibaraki-ken, Japan

[21] Appl. No.: 558,036

[22] Filed: Dec. 5, 1983

[30] Foreign Application Priority Data

| | | |
|---|---|---|
| May 20, 1983 [JP] | Japan | 58-87625 |
| Jun. 9, 1983 [JP] | Japan | 58-101716 |
| Jun. 13, 1983 [JP] | Japan | 58-104227 |

[51] Int. Cl.$^4$ .................. B29C 15/00; B29C 17/10
[52] U.S. Cl. .................. 425/163; 425/164; 425/202; 425/204; 425/297; 425/308; 425/371
[58] Field of Search .................. 425/155, 161, 162, 163, 425/164, 296, 297, 302.1, 204, 371, 403.1, 142, 145, 202, 308; 426/272, 512, 513; 198/726, 692, 693, 698, 699

[56] References Cited

U.S. PATENT DOCUMENTS

| | | |
|---|---|---|
| 572,110 | 1/1896 | Gray . |
| 3,400,426 | 9/1968 | Boggs . |
| 3,537,138 | 11/1970 | Brown et al. . |
| 3,988,976 | 11/1976 | Slezak . |
| 4,460,611 | 7/1984 | Susuki .................. 425/327 |

Primary Examiner—Willard E. Hoag
Attorney, Agent, or Firm—Steinberg & Raskin

[57] ABSTRACT

A food shaping apparatus is disclosed which is capable of automatically forming boiled rice into a shaped food such as oval-shaped sushi or the like with good repeatability and reliability. The apparatus comprises a transfer mechanism capable of forcedly downwardly carrying boiled rice while compressing, a dividing mechanism capable of dividing boiled rice to form rice blocks of a fixed quantity and allowing the rice blocks to be received in forming cylinders without deflecting, a turntable capable of readily forming a shaped food different in size and/or configuration and easily cleaning the forming cylinders incorporated therein, a pressing mechanism capable of forming the rice block into a finsihed shaped food, and a control mechanism capable of controlling the linked actions among the transfer mechanism, dividing mechanism and turntable.

31 Claims, 21 Drawing Figures

FIG. 3
FIG. 4
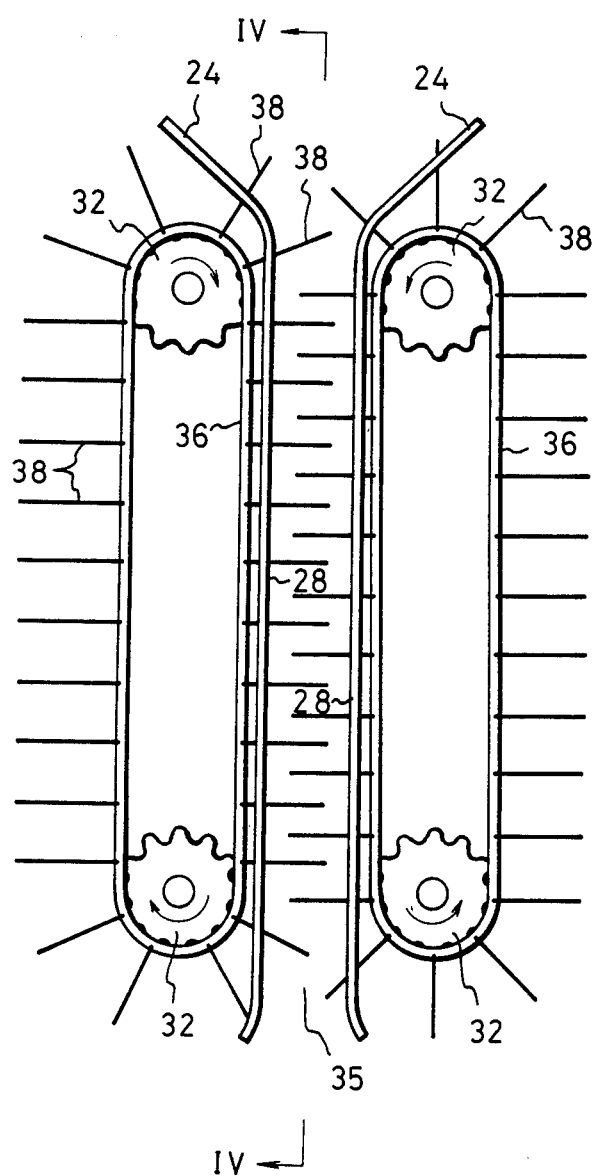
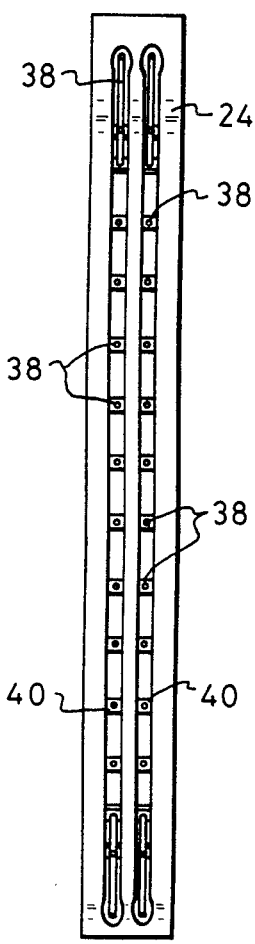

FIG. 5
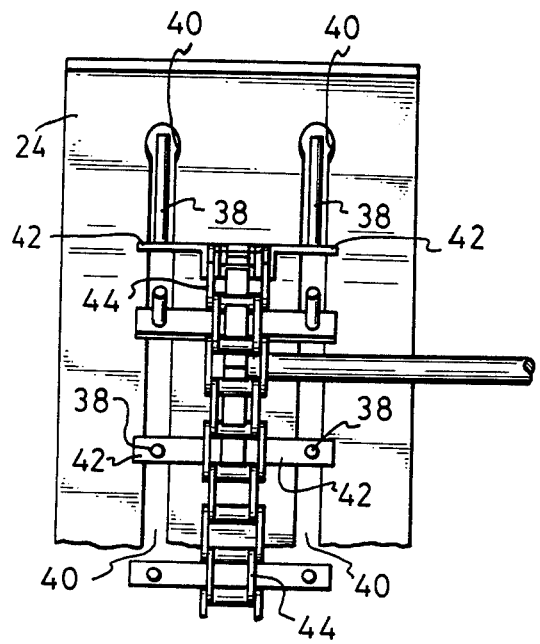
FIG. 6A
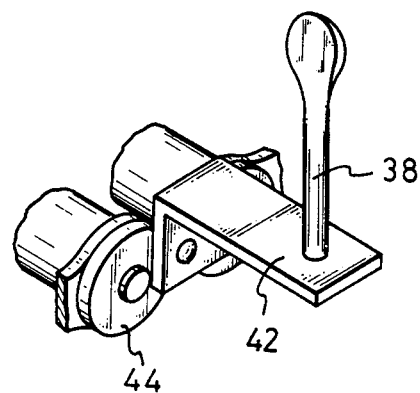
FIG. 6B
FIG. 7
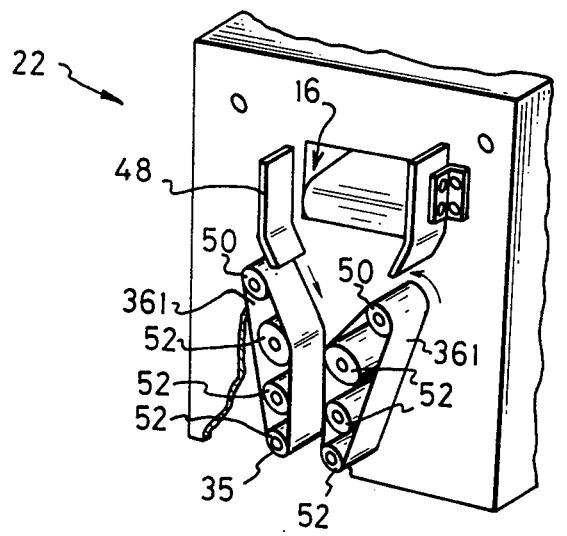

SUSHI SHAPING APPARATUS

BACKGROUND OF THE INVENTION

Field of the Invention

This invention relates to a food shaping apparatus, and more particularly to an apparatus for automatically successively shaping a rice food such as oval-shaped sushi, a rice ball or the like which has been conventionally hand-shaped.

The term "oval-shaped sushi" used herein means small oval-shaped vinegared rice balls topped with sliced fillet of a variety of fish and shellfish, mostly raw but sometimes cooked, or a small slice omelet. The sushi is eaten dipped in soy source, and is food peculiar to Japan but now spreads abroad in the world. Whereas, the term "rice ball" used herein means rice food formed into a round or triangular shape and covered with a dried seaweed-layer sheet, sprinkled with sesame seeds or the like, with the center often filled with pickled plum, codfish roe, salty salmon or spicy boiled foods. This is a popular rice food in Japan for picnics or traveling and called "o-nigiri" or "o-musubi".

A typical conventional food shaping apparatus, particularly, oval-shaped sushi shaping apparatus is disclosed in Japanese Patent Publication No. 38175/1981. The apparatus disclosed was developed by the inventor. The conventional apparatus is adapted to successively form oval-shaped sushi, and comprises a hopper to be charged with boiled rice, a means for dividing the rice to form a plurality of rice blocks of a fixed quantity which is connected to the hopper, a turntable having a plurality of forming cylinders arranged at the periphery thereof which are positioned below the dividing means so as to receive therein the rice block dropped from the dividing means, a piston slidably fitted in each of the cylinders, a pressing means for compressingly forming the rice block into an oval shape in the cylinder in cooperation with the piston, and a driving mechanism for intermittently rotating the turntable.

The dividing means of the conventional apparatus comprises two discs arranged to be vertically spaced from each other and rotate in the same direction which respectively have through-holes formed so as not to be vertically aligned with each other. Accordingly, the apparatus cannot substantially divide boiled rice to form rice blocks of a fixed quantity when the rice has a high viscosity, because the dividing means cannot sufficiently compress the rice. Also, the apparatus does not allow the so-formed rice blocks to be dropped in a constant direction because the discs cut the rice while rotating in the same direction, thus, it is substantially impossible to precisely receive the rice blocks in the forming cylinders.

In the conventional apparatus, boiled rice charged in the hopper is transferred therefrom to the dividing means by means of a transfer means which comprises a pair of endless belts vertically arranged to be opposite to each other at intervals. The endless belt must be formed to have a non-adherent surface or subjected to a surface treatment so that boiled rice does not adhere to the belt. However, it has been found that this does not allow the transfer means to constantly carry the boiled rice because the belt often idles with respect to the rice due to its non-adherent surface. Also, it is required to arrange the belts in a manner to render the lower portion of a gap therebetween narrower. Otherwise, the boiled rice would drop by gravity irrespective of action of the belts. However, this causes a large pressure to be applied to the rice, to thereby interfere with subsequent operations and cause finished oval-shaped sushi to be inferior in aesthetics and taste.

Also, in the conventional apparatus, the pressing means acts to vertically press the rice blocks during rotation of the turntable; thus, it is necessarily required to provide the pressing means with a rotation mechanism, resulting in the apparatus to be complicated in structure. In addition, the conventional pressing means has further disadvantages that an ingredient such as sliced fillet of fish or shellfish put on the rice block is often taken off and it is substantially difficult to control a pressure to be applied onto the rice block.

Further, the conventional apparatus is not provided with a means for applying a Japanese horseradish (wasabi) to the top of the rice block before the ingredient is put on the rice block. This causes such operation to be carried out by hand.

Furthermore, in the conventional apparatus the forming cylinder is formed integral with the turntable. Thus, when oval-shaped sushi is desired which is different in size and/or configuration, it is necessary to exchange the turntable itself, to thereby require much time and labor. Also, cleaning of the cylinder after the preparation of sushi requires removal of the turntable.

Still further, the conventional shaping apparatus has a further disadvantage that a mechanism for controlling the linked actions among the transferring means, dividing means and turntable is not adapted to allow such actions to be controlled as desired. For example, the mechanism often causes malfunction in the operation of shaping rice blocks, resulting in uneven finished sushi being formed. Particularly, the apparatus has a fault in the operation of precisely actuating the transfer means and the turntable or forming means corresponding to the change of operating position of the dividing means.

SUMMARY OF THE INVENTION

The present invention has been made in view of the foregoing disadvantages of the prior art.

Accordingly, it is an object of the present invention to provide a food shaping apparatus which is capable of effectively carrying out the smooth transfer of a food material from a hopper to a dividing mechanism while compressing, to thereby facilitate subsequent operations.

It is another object of the present invention to provide a food shaping apparatus which allows a food material to be forcedly downwardly carried without falling.

It is another object of the present invention to provide a food shaping apparatus which is capable of dividing a food material to form food material blocks of a substantially fixed quantity and allowing the blocks to be received in forming cylinders of a turntable without deflecting.

It is another object of the present invention to provide a food shaping apparatus which is capable of readily forming shaped food different inside and/or configuration and easily cleaning a forming cylinder.

It is another object of the present invention to provide a food shaping apparatus which is capable of effectively forming a food material block into a finished shape by a simple mechanism while holding an ingredient on the block, and controlling pressure to be applied to the block.

It is a further object of the present invention to provide a food shaping apparatus which is capable of automatically successively supplying an additive to the food material block.

It is still a further object of the present invention to provide a food shaping apparatus which is capable of precisely controlling the linked actions among a transfer mechanism, a dividing mechanism and a turntable to form even finished food.

In accordance with the present invention, there is provided a food shaping apparatus which comprises a hopper adapted to be charged with a food material and having a delivery means provided therein which acts to carry the food material to an outlet of the hopper; a transfer mechanism for downwardly transferring the food material discharged from the outlet of the hopper, the transfer mechanism being arranged adjacent to the outlet of the hopper and including a pair of carrying means which are vertically arranged opposite to each other to define a path therebetween to forcedly transfer the food material through the path; a dividing mechanism for cutting the food material to prepare food material blocks of a substantially fixed quantity, the dividing mechanism comprising a cutter having a pair of blades arranged in proximity to the lower end of the carrying means and a cutter actuating means for allowing the blades to abut against each another or contactedly cross each other right below the central portion of the path; and control means for intermittently driving the transfer mechanism and alternately actuating the transfer mechanism and the dividing mechanism.

The transfer mechanism may comprise a pair of endless belts vertically arranged opposite to each other to define a gap therebetween and a roller means for supporting and driving the endless belts, the gap defined between the belts comprising an upper portion disposed adjacent to the outlet of the hopper to receive therein the food material discharged from the outlet and a middle to lower portion forming said path for carrying the food material while compressing. Alternatively, the transfer mechanism may comprise a pair of vertically extending guide plates arranged opposite to each other to define at least the path therebetween, the guide plates each having at least one slit formed in the longitudinal direction thereof; an endless traveling member arranged to travel along the outer surface of each of the guide plates; and a plurality of guide pins fixed at suitable intervals on the endless traveling member so as to outwardly extend therefrom, the guide pins being adapted to have access to the slit of the guide plate.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein:

FIG. 3 is a enlarged front view showing the essential part of a transfer mechanism of the apparatus shown in FIG. 1;

FIG. 4 is a sectional view taken along line IV—IV of FIG. 3;

FIG. 5 is a side view showing the upper portion of a transfer mechanism;

FIG. 6A is a perspective view showing the mounting of a feed pin on an endless chain in a transfer mechanism;

FIG. 6B is a perspective view showing a modification of a feed pin;

FIG. 7 is a modification of a transfer mechanism;

DETAILED DESCRIPTION OF THE PREFERRED EMBODIMENTS

Now, a food shaping apparatus according to the present invention will be hereinafter described with reference to the accompanying drawings.

Figure 1:
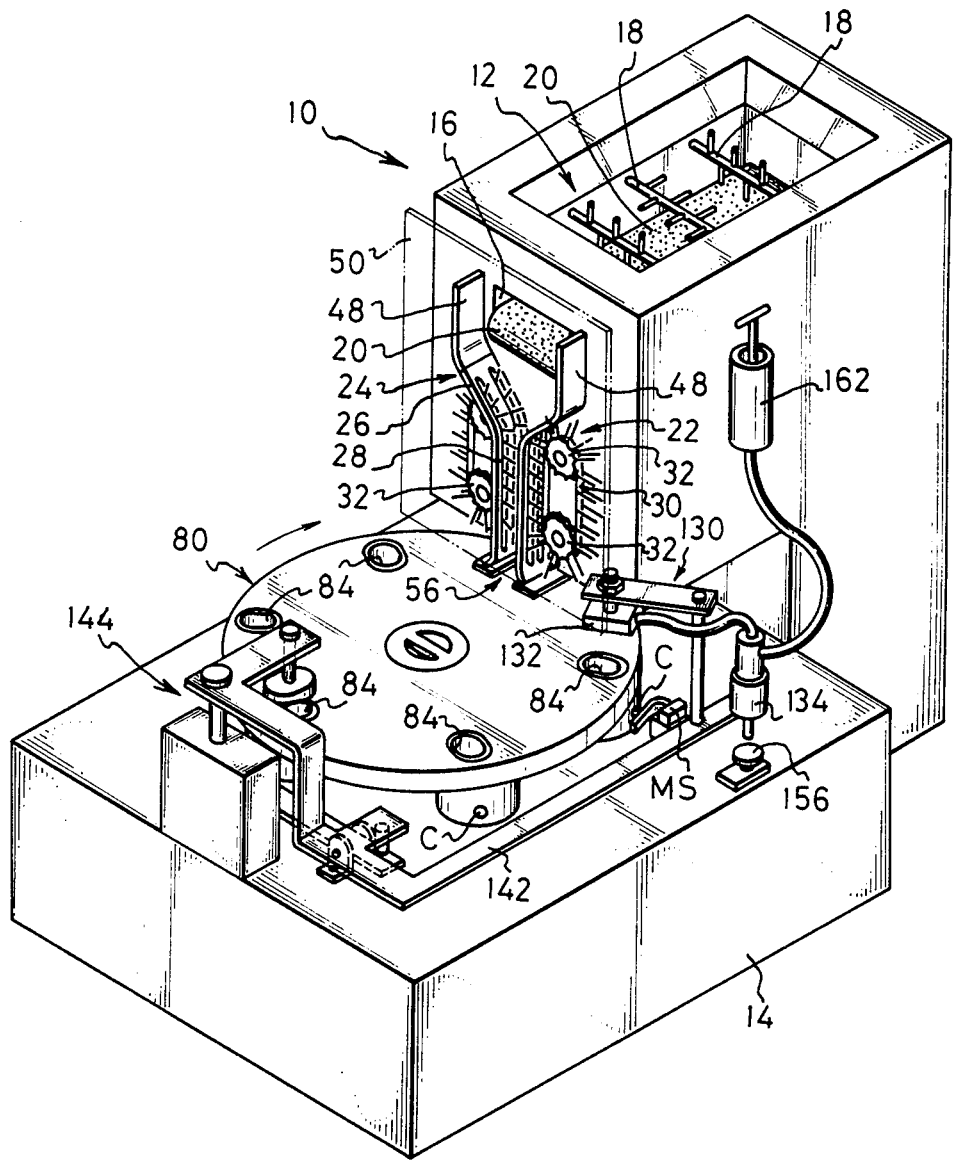
FIG. 1 is a perspective view showing an embodiment of a food shaping apparatus according to the present invention.

Referring to FIG. 1 illustrating an embodiment of a food shaping apparatus according to the present invention, a food shaping apparatus generally indicated by reference numeral 10 is in the form of an apparatus for forming oval-shaped sushi. The apparatus 10 includes a hopper 12 mounted on a casing 14, which is adapted to receive boiled rice therein. The hopper 12 is provided with an outlet 16 and has a rotatable stirring means 18 provided therein which comprises a plurality of stirring rods arranged to stir boiled rice in the hopper 12. The hopper 12 also has a conveyor belt 20 provided therein which acts to carry boiled rice to the outlet 16.

Reference numeral 21 (FIG. 2) designates a driving source or motor for intermittently operating the conveyor belt 20 which is controlled by a control circuit described hereinafter. However, the conveyor belt 20 may be driven by a motor for a transfer mechanism described hereinafter without specifically providing the motor 21.

Figure 2:
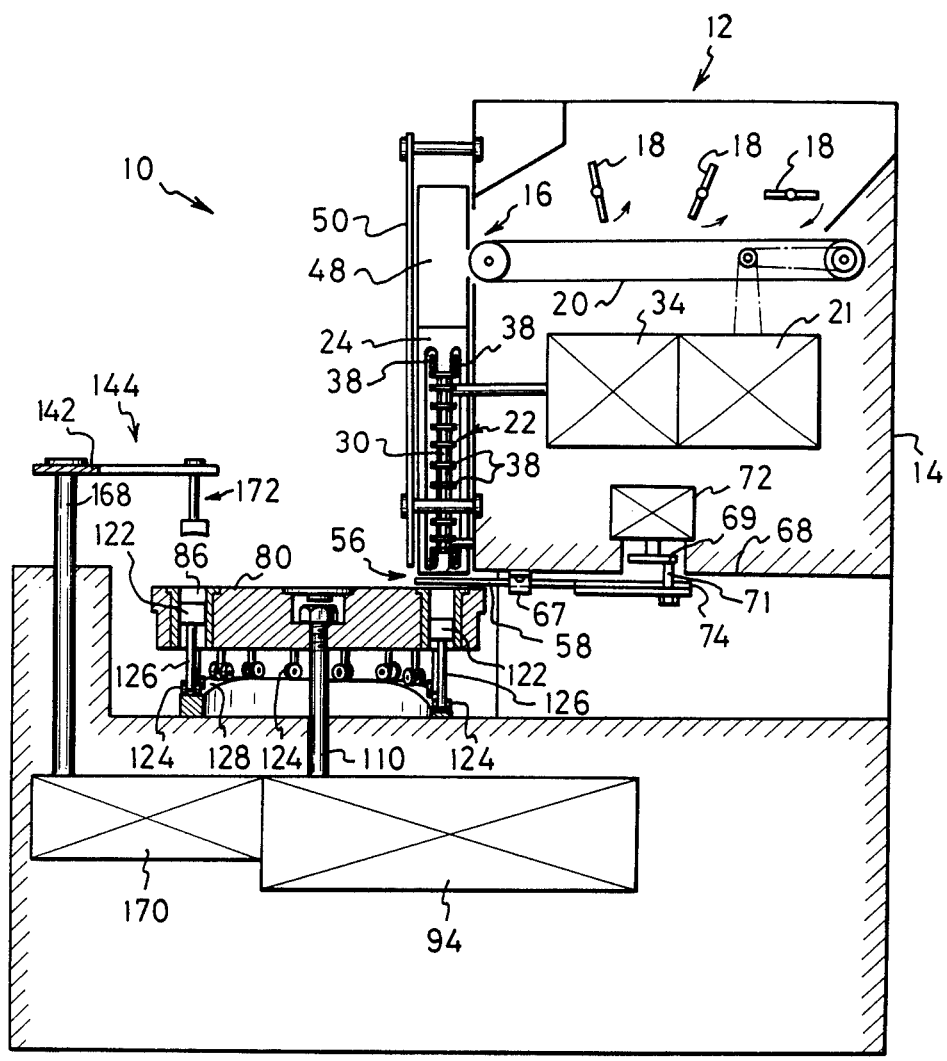
FIG. 2 is a vertical sectional view of the food shaping apparatus shown in FIG. 1.

The food shaping apparatus also includes a boiled rice transfer mechanism 22 provided below the outlet 16 of the hopper 12, which acts to effectively downwardly transfer boiled rice discharged from the outlet 16 of the hopper 12 and reduce the width of boiled rice flowing therethrough to a predetermined level. The transfer mechanism 22 comprises a pair of guide plates 24 formed into a substantially funnel-like shape. More particularly, the guide plates 24 comprise a pair of inclined plates 26 and a pair of vertical plates 28 downwardly extending from the plates 26. The transfer mechanism 22 also comprises an endless traveling member 30 engagedly supported on a pair of wheels 32 such as sprockets to move along the outer surface of each guide plate 24, as detailedly shown in FIGS. 3 and 4. The transfer mechanism 22 further comprises a driving source or motor 34 for driving the traveling members 30 through the sprockets (FIG. 2). In the embodiment, the motor 34 is connected to one of the sprockets 32 of each pair. The guide plate 24 is preferably formed of a material capable of preventing boiled rice from adhering thereto, for example, such as fluoroplastic or the like, or coated with such material. The vertical plates 28 of the guide plates 24 are arranged opposite to each other with a gap or path 35 of an interval which allows boiled rice discharged from the outlet 16 to have the substantially same width and depth as a bore of a shaping cylinder of a turntable described hereinafter after it has passed between the two vertical plates 28.

In the embodiment illustrated, the traveling members, as shown in FIG. 3, each comprise an endless chain 36 and a plurality of feed pins 38 fixed on the chain 36 to outwardly extend therefrom. An endless belt may be substituted for the chain 36. The guide plates 24 each are formed with at least one slit 40 through which the feed pins 38 are allowed to have access to the gap or path 35 between the two guide plates 24.

The feed pins 38 may be mounted on the chain 36 in a manner as shown in FIGS. 5 and 6. More particularly, mounting of the feed pins 38 is carried out by vertically fixing the feed pins 38 on flanges 42 formed at suitable intervals on outside link plates 44 of the chain 36. In the embodiment, the feed pins 38 are arranged in two rows as shown in FIGS. 4 and 5. However, those may be arranged in only one row. Alternatively, the pins 38 may be arranged in three rows or more. When the feed pins 38 are arranged in two rows or more, the flanges 42 each may be provided on the chain 36 to extend between the outside link plates 44 opposite to each other on the both sides of the chain. In this instance, the slits 40 are preferably formed at the guide plate 24 corresponding in number to rows of the feed pins.

The feed pin 38 may be formed to have a uniform diameter or a diameter changed at a ratio along the longitudinal direction thereof. However, it is preferably formed into a substantially spoon-like shape to allow boiled rice to effectively transferred, as shown in FIG. 6A. Alternatively, it may be formed to have a sphere-like portion 46 at the top end thereof, as shown in FIG. 6B. The driving source or motor 34 for the transfer mechanism 22 may be provided separate from that 21 for the conveyor belt 20, as shown in FIG. 2. However, it may be used commonly to both of the transfer mechanism and conveyor belt. The traveling members 30 are naturally driven in a manner such that the feed pins 38 on the opposite endless chains 36 alternately travel in the gap 35 between the two guide plate 24.

In FIG. 1, reference numeral 48 designates a pair of auxiliary guide plates vertically extending from the inclined plates 26 to prevent boiled rice discharged from the outlet 16 of the hopper 12 from scattering. For the same purpose, it is preferable to provide a front cover 50 extending from the outlet 16 to the lower portion of the transfer mechanism 22 to fully cover the outlet and transfer mechanism.

As can be seen from the foregoing, the boiled rice transfer mechanism 22 allows the width of boiled rice discharged from the outlet 16 of the hopper 12 to be reduced to a predetermined level, to thereby facilitate succeeding operations. Also, boiled rice is forcedly transferred by the feed pins 38 in the gap 35 of a narrow interval defined between the two vertical plates 28, so that it may be smoothly supplied to the lower portion of the transfer mechanism 22 in a compressed state without clogging the gap. The guide pins 38 also serves to support boiled rice thereon during the transportation, to thereby prevent boiled rice from dropping by gravity in the gap. Thus, it will be also noted that the transfer mechanism allows boiled rice to be effectively transferred at a uniform rate.

The transfer mechanism may be constructed in such a manner as shown in FIG. 7. A transfer mechanism 22 of FIG. 7 is adapted to suitably compress boiled rice which is difficult to be compressed because of its high viscosity, and comprises a pair of endless belts 361 supported on a pair of driving rolls 50 and plural pairs of guide rolls 52 arranged in a manner such that a gap or path 35 between the both belts is preferably gradually constricted in the downward direction. The upper part of the path 35 acts to receive boiled rice discharged from an outlet 16 of a hopper (not shown) and the middle to lower part thereof serves to suitably compress boiled rice, so that the transfer mechanism may effectively compress boiled rice of high viscosity difficult to be compressed by the conventional transfer means. In FIG. 7, the endless belts 361 are preferably stretched in a manner to be movable in the lateral direction so that compression to be applied to boiled rice may be varied depending upon viscosity of boiled rice. This may be accomplished, for example, by arranging the rolls so as to be slidable in the lateral direction. The remaining part of the transfer mechanism of FIG. 7 is constructed in the substantially same manner as the transfer mechanism described above.

Figure 8:
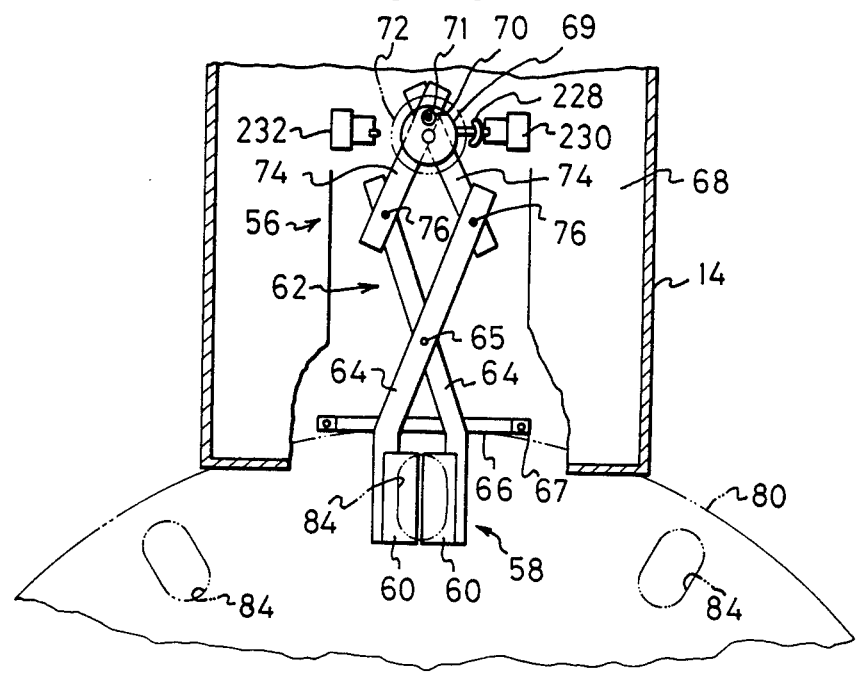
FIG. 8 is a plan view showing the essential part of a dividing mechanism in the apparatus shown in FIG. 1.

The food shaping apparatus 10 of the present embodiment also includes a mechanism for dividing boiled rice discharged through the path 35 of the transfer mechanism 22 to prepare a plurality of rice blocks of a substantially fixed quantity, which is generally designated by reference numeral 56 in FIGS. 1 and 2. The dividing mechanism 56, as shown in FIGS. 1, 2 and 8, includes a cutter 58 arranged in proximity to the lower end of the path 35 of the transfer mechanism 22 in such a manner that a pair of blades 60 abut against each other or contactingly cross each other right below the central portion of the path 35. The dividing mechanism 56 also includes a cutter actuating means 62. The means 62 includes a pair of actuating rods 64 each having the blade 60 fixed on the front end thereof and arranged to be rotatable about a pin 65. Each of the actuating rods 64 is slidably received at a part thereof in a recess 66 of a supporting member 67 fixed on the lower surface of a bottom plate 68 of the casing 14. The pin 65 is also fixed on the lower surface of the bottom plate 68. Reference numeral 69 designates a driving shaft which is formed with an eccentric hole 70 for freely fitting a pin 71 therein. The driving shaft 69 is rotated by a driving source or motor 72. Reference numeral 74 indicates a pair of movable rods forming a linkage, which are rotatably supported on the pin 71 and connected through pins 76 with the actuating rods 64. The dividing mechanism 56 constructed as described above is adapted to allow the cutter 58 to carry out a rice cutting operation of one cycle every time when the motor 72 rotates the driving shaft 69 once through a control mechanism described hereinafter.

Figure 9:
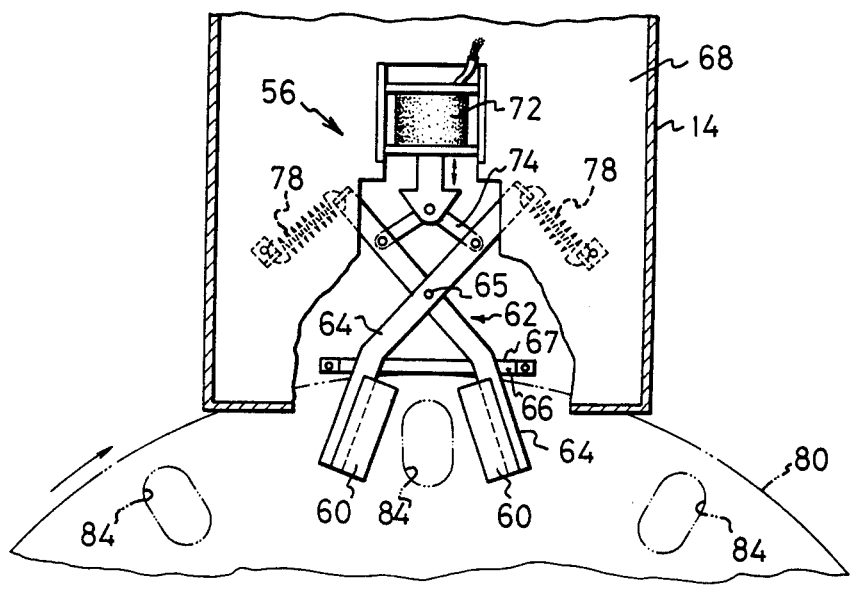
FIG. 9 is the essential portion of a modification of the dividing mechanism shown in FIG. 8.

The cutter actuating means 62 of the dividing mechanism 56 may be constructed as shown in FIG. 9. In FIG. 9, a tension spring 78 is fixedly interposed between the rear end portion of each of actuating rods 64 and the lower surface of the bottom plate 68 of the casing 14. Also, the cutter actuating means 62 includes a solenoid-operated driving source 72 fixedly fitted in a cutout of the bottom plate 68 and connected through a linkage 74 to the actuating rods 64.

Reference numeral 80 designates a turntable mechanism employed in the food shaping apparatus of the illustrated embodiment, which is adapted to allow oval-shaped sushi different in size and/or configuration to be readily formed and a forming cylinder to be easily cleaned without removing a turntable body from the apparatus.

Figure 10:
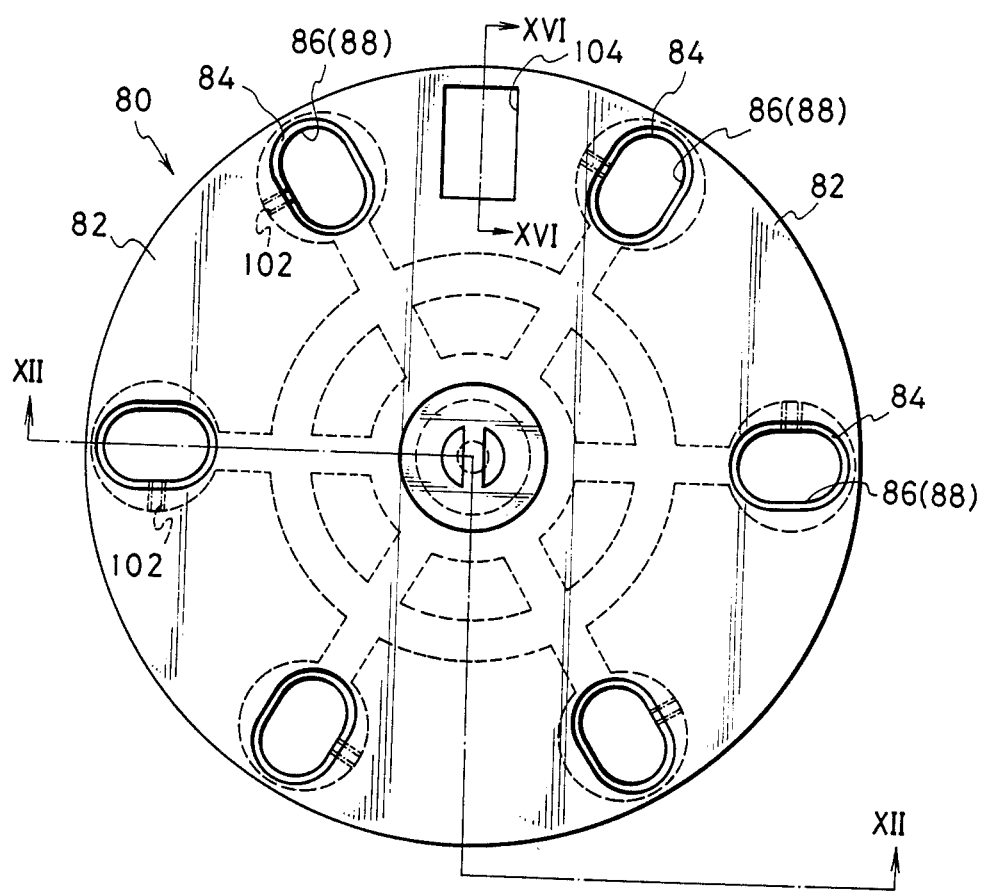
FIG. 10 is enlarged plan view showing a turntable in the apparatus shown in FIG. 1.
Figure 11:
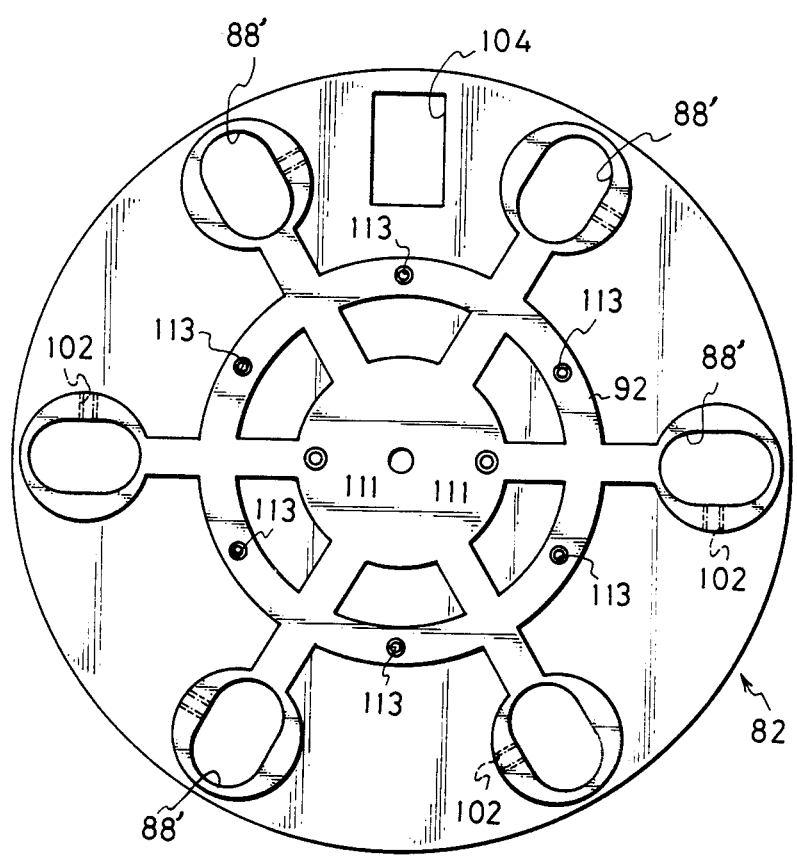
FIG. 11 is a bottom view of the turntable shown in FIG. 10.
Figure 12:
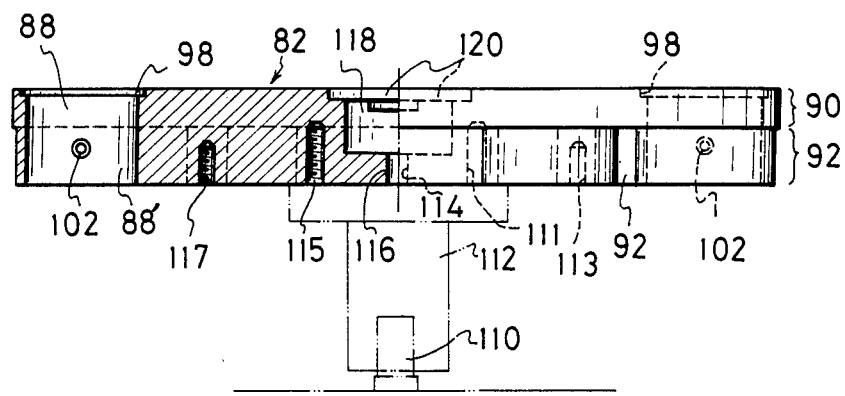
FIG. 12 is a vertical sectional view taken along line XII—XII of FIG. 10.
Figure 13:
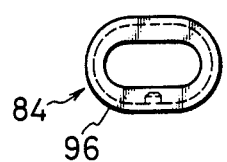
FIG. 13 is a plan view showing a forming cylinder mounted in the turntable shown in FIG. 10.
Figure 14:
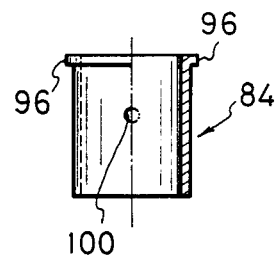
FIG. 14 is a front view partly in section of the cylinder shown in FIG. 13.
Figure 15:
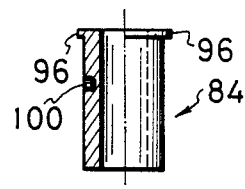
FIG. 15 is a side view partly in section of the cylinder shown in FIG. 13.

The turntable 80 comprises a turntable body 82 shown in FIGS. 10 to 12 and a plurality of forming cylinders 84 each having a bore 86 formed therethrough which are shown in FIGS. 13 to 15. In the embodiment, the bore 86 is formed into an oval-shape. The turntable body 82 is formed at the peripheral portion thereof with a plurality of through-holes 88 in which the forming cylinder 84 are to be detachably fitted. The through-holes 88 are arranged in a circle. The turntable body 82, as shown in FIG. 12, consists of an upper plate member 90 having a flat and smooth surface and a lower member 92. The lower member 92 substantially comprises a reinforcing rib which serves to reinforce the upper plate member 90, connect the member 90 to a driving source 94 therethrough and ensure fixing of the forming cylinders 84 with respect to the turntable body 82. The rib 92, as shown in FIGS. 11 and 12, is formed with a plurality of through-holes 88' at the positions corresponding to the through-holes 88 of the upper plate member 90.

Thus, it will be noted that the turntable body 82 is constructed to allow the weight to be significantly reduced. The turntable 82 may be formed of plastics. However, formation of the turntable body using a lightweight alloy such as aluminum further allows the weight to be significantly decreased, to thereby decrease load applied to the turntable, a driving shaft thereof and the like during the operation.

In the embodiment, the forming cylinder 84 is formed into a substantially oval-shape in section. The cylinder 84, as shown in FIGS. 13 to 15, is provided at the outer periphery of the upper end thereof with a flange-like stopper 96 which acts to engage with the upper edge of the through-hole 88 of the turntable body 82 to prevent the cylinder 84 from dropping. The turntable body 82 is preferably formed at the outer periphery of the upper end of the through-hole 88 with a recess 98 which receives the stopper 96 of the cylinder 84 therein, to thereby permit the upper end of the cylinder 84 to be flush with the upper plate member 90 when the cylinder is fitted in the through-hole 88 (88'). Also, it is desired that the cylinder 84 does not freely move in the through-hole 88 (88') during the operation. For this purpose, the cylinder 84 is provided at the outer surface thereof with a small recess 100 for receiving a suitable fixing means such as a screw therein, and correspondingly, the wall of the rib 92 defining the through-hole 88' is provided with a small screw hole 102 therethrough. The cylinder 84 may be detachably fitted in the through-hole 88 (88') by means of a stopper pin forced by a spring and received in the recess 100 through the screw hole 102.

The forming cylinder 84 is preferably formed of fluoroplastic. Alternatively, the cylinder 84 may be coated at the surface of the bore 86 with fluoroplastic. This effectively prevents the chemical reaction between the cylinder and vinegar added to boiled rice and facilitates cleaning of the cylinder.

Figure 16:
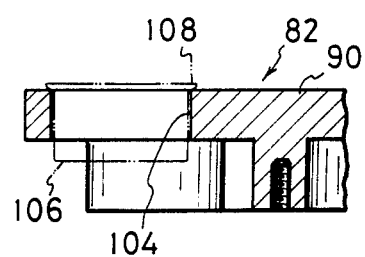
FIG. 16 is a sectional view taken along line XVI—XVI of FIG. 10.

In FIGS. 10 and 11, reference numeral 104 designate an opening formed at a suitable place of the turntable body 82. The opening 104 serves to fit therein a container 106 (FIG. 16) for receiving vinegar, a brush used to apply vinegar onto a rice block, and the like. In FIG. 16, the container 106 is received in the opening 104 in a manner such that the upper end of the container 106 upwardly projects from the turntable body 82. However, the turntable body 82 may be preferably formed at the periphery of the upper end of the opening 104 with a step (not shown) adapted to receive a flange-like stopper 108 formed at the outer periphery of the container 106, so that the upper surface of the container 106 is flush with the upper plate member 90 of the turntable body 82.

The turntable 80 is connected at the central portion of the underside thereof to a driving shaft 110 through a connector 112, as shown in FIG. 12. For this purpose, the lower surface of the turntable 80 is formed with a hole 114 for receiving therein a bolt 116 fixed on the connector 112. The turntable 80 is also provided at the upper surface thereof with a recess 118, which is formed substantially concentric with the hole 114 and communicated therewith. The recess 118 is adapted to receive therein a nut, a wing nut or the like which is tightly engaged with the bolt 116. The recess 118 is covered with a lid 120, which acts to prevent dust or the like from entering the recess and block the upper surface of the turntable body 82 from being soiled by lubricant oil of the driving shaft 110, connector 112 or the like. In FIG. 12, the turntable 80 is connected through the connector 112 to the driving shaft 110, as described above. However, it may be connected directly to the shaft 110 as shown in FIG. 2.

The reinforcing rib 92, as shown in FIG. 11, is suitably formed with screw holes 111 and 113. The holes 111 are used to screwingly fit therein screws 115 for fixing the connector 112 with respect to the turntable 80 and the holes 113 are used to reinforce fixing of the connector having a larger surface area on the turntable by means of screws 117. The holes 113 may be also used to mount a guide member for guiding pistons vertically moved in the bores 86 which will be hereinafter described in detail.

The forming cylinders 84 each have a piston 122 vertically slidably fitted in the bore 86, as shown in FIG. 2. The piston 122 has a traveling roller 124 mounted at the lower end thereof through a piston rod 126. Reference numeral 128 indicates a substantially circular guide path having undulations which allow the pistons 122 to carry out a predetermined vertical movement while the rollers 124 are traveling on the guide path 128 with rotation of the turntable 80.

Reference character MS (FIG. 1) designates a microswitch or lead switch fixed on the casing 14; and reference character C designates a plurality of contacts provided on the peripheral side surface of the turntable 80 at predetermined intervals, which act to intermittently operate the switch MS with rotation of the turntable in a direction indicated by an arrow. The switch MS is incorporated in a control circuit for the motors 21, 34 and 72 described hereinafter in detail to allow the motors to be operated in relation to rotation of the turntable 80.

Figure 17:
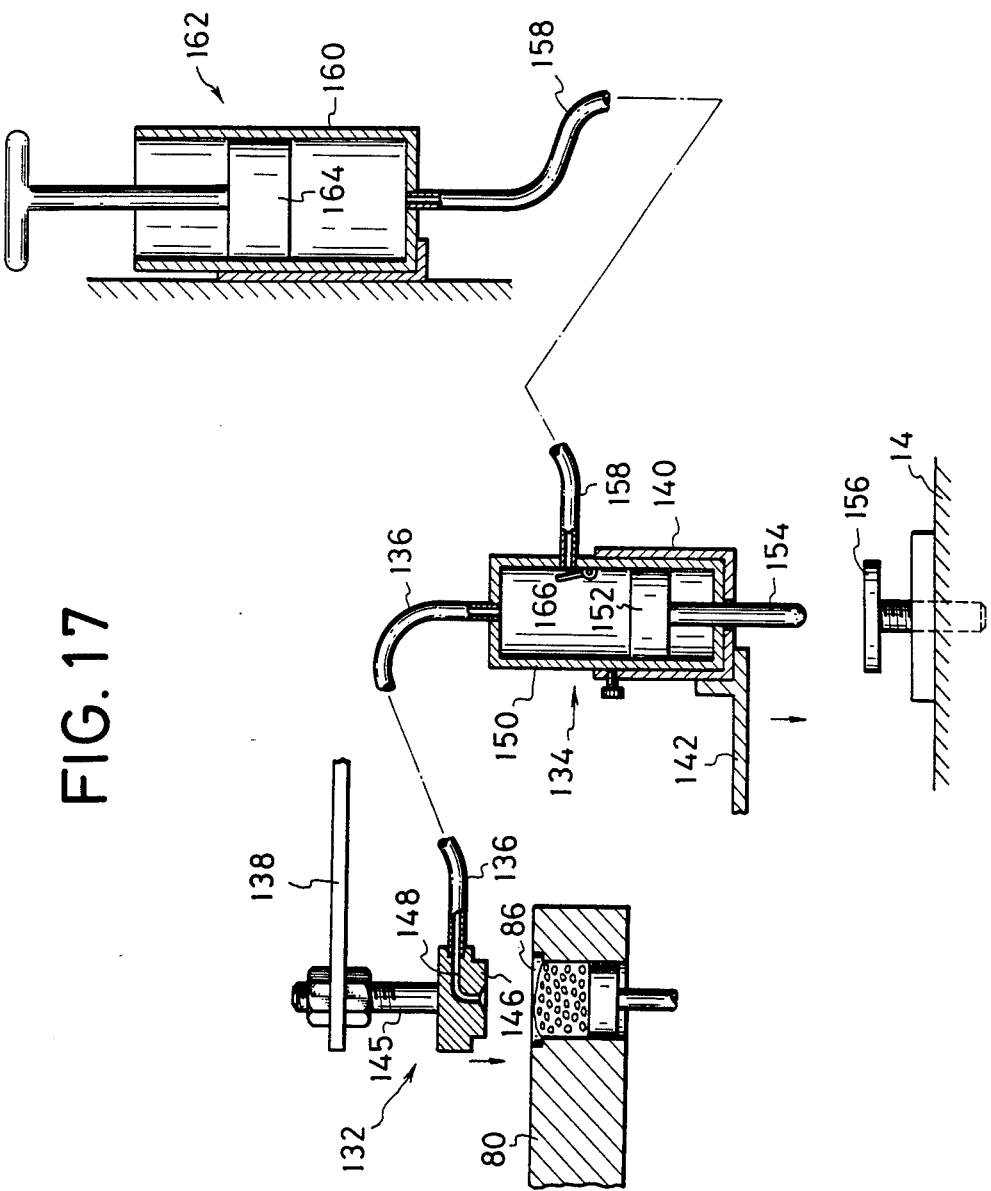
FIG. 17 is an enlarged detail view showing an additive supply mechanism in the apparatus shown in FIG. 1.

The food shaping apparatus 10 of the illustrated embodiment further includes a mechanism for automatically successively supplying or applying an additive or Japanese horseradish (wasabi) onto a rice block received in each of the cylinder bores 86, which is generally indicated by reference numeral 130 in FIG. 1. The wasabi application mechanism 130, as shown in FIG. 17, includes an outlet means 132 for discharging wasabi therefrom which is arranged above a part of moving locus of the forming cylinders 84, a pumping means 134 communicated through a feed pipe 136 with the outlet means 132, and supporting members 138 and 140 for respectively fixing the outlet means 132 and the pumping means 134 with respect to a vertically moving arm 142. In the embodiment illustrated, the arm 142 is connected to a pressing mechanism 144 described hereinafter to allow the application mechanism 130 to be operated in synchronism with the pressing mechanism 144. The supporting members 138 and 140 are connected to the arm 142.

The outlet means 132, as shown in FIG. 17, is fixed onto the supporting member 138 through a threaded rod 145 which is adapted to adjust the vertical position or height of the outlet means. The outlet means 132 is arranged to be positioned right above the forming cylinder 84 when the turntable 80 is stopped during the intermittent rotation. The outlet means 132 has a lower surface 146 which is formed to have the substantially same planar configuration as the bore 86 of the cylinder 84, and is provided with an outlet path 148 which is communicated at one end thereof with the lower surface 146 and connected at the other end thereof to the feed pipe 136. The feed pipe 136 is connected at the other end thereof to an intermittent supply cylinder 150, which is securely or detachably fixed through the supporting member 140 on the connection arm 142. The pumping cylinder 150 has a piston 152 slidably fitted therein and a piston rod 154 downwardly extending from the piston and outwardly projecting from the cylinder 150. Reference numeral 156 designates a threaded member having a disc fixed thereon which is mounted on the casing 14 so as to be positioned just below the piston rod 154. The member 156 acts to limit the downward movement of the piston rod 154 to a desired level. The vertical position of the threaded member 156 is adjusted by rotating the member 156. The pumping cylinder 150 also has another feed pipe 158 connected to the side wall thereof, with the other end thereof being connected to a cylinder 160 of a continuous supply means 162. The cylinder 160 has a piston 164 detachably fitted therein, which acts to continuously supply Japanese radish (wasabi) paste received in the cylinder 160 to the feed pipe 158 due to its weight.

The manner of operation of the wasabi application mechanism 130 will be hereinafter described with reference to FIGS. 1 and 17.

In FIG. 1, when the turntable 80 is intermittently turned in a manner as described below to allow one of the cylinders 84 to be stopped just below the outlet means 132, the arm 142 is downwardly moved to allow the outlet means 132 and the intermittent supply means 134 to be downwardly moved together. This permits the lower surface 146 of the outlet means 132 to be in close proximity to the bore 86 of the cylinder 84, resulting in the lower surface 146 substantially abutting against the upper surface of a rice block received in the bore 86. At this time, the piston rod 154 of the intermittent supply cylinder 150 abuts against the threaded member 156 to upwardly press the piston 152, so that wasabi paste received in the cylinder 150 is discharged from the path 148 through the feed pipe 136 onto the rice block in the bore 86. In this regard, the piston 164 of the continuous supply means 162 is desired to have a weight sufficient to prevent the back-flow of wasabi paste to the feed pipe 158 due to such upward pressing of the piston 152. Alternatively, such back-flow may be effectively prevented by providing the inner surface of the side wall of the cylinder 150 with a check valve 166. Then, the arm 142 is upwardly moved to allow the outlet means 132 and the intermittent supply means 134 to be upwardly moved, resulting in one cycle of the application operation terminating. Subsequently, when the turntable is intermittently turned to position another one of the cylinders 84 just under the outlet means, the application operation described above is automatically repeated.

In the embodiment illustrated, the vertical position of the lower surface 146 of the outlet means 132 with respect to the cylinder 84 is adjusted by the threaded rod 145; and the stroke width of the piston 152 of the intermittent supply means 134 is adjusted by varying the height of the threaded member 156, resulting in the discharge of wasabi paste being controlled as desired.

A rice block to which wasabi paste has been applied is put thereon an ingredient such as a sliced fillet of fish or shellfish by hand or a suitable means (not shown) and subsequently carried to the pressing mechanism 144 hereinafter described in detail to be formed into finished oval-shaped sushi while it is held in the forming cylinder 84 of the turntable 80.

Figure 18:
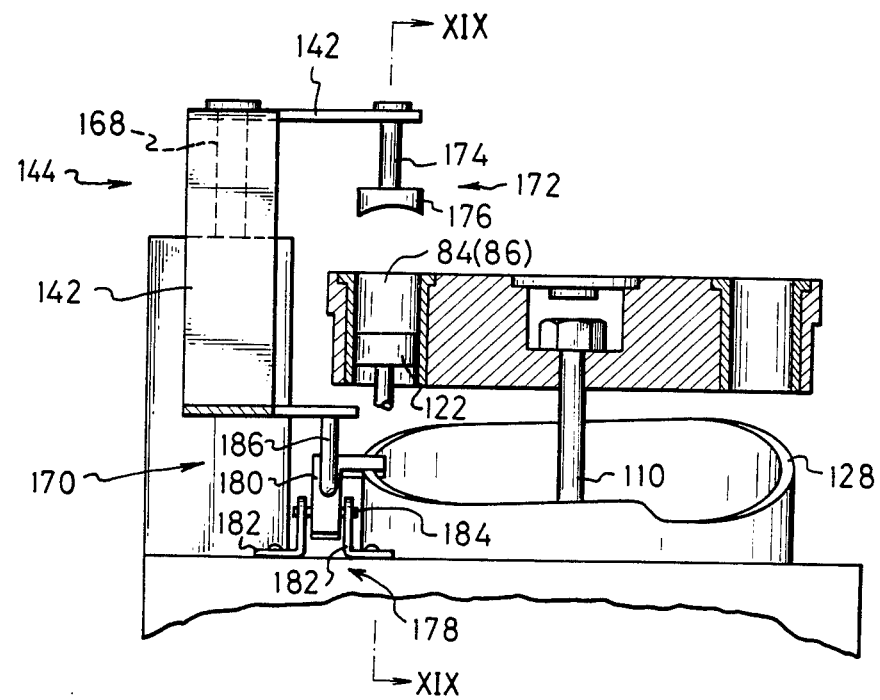
FIG. 18 is partly sectional view showing the essential part of a pressing mechanism in the apparatus of FIG. 1.
Figure 19:
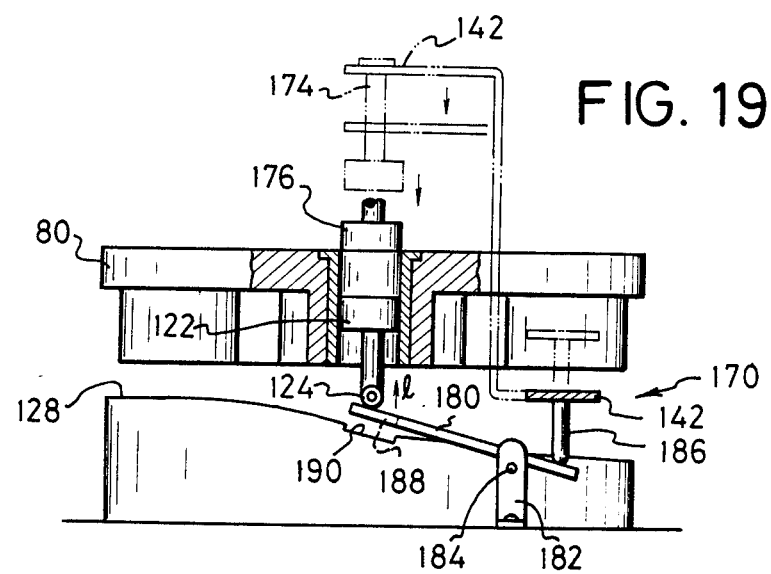
FIG. 19 is a sectional view taken along line XIX—XIX of FIG. 18.

The pressing mechanism 144 which forms a part of the food shaping apparatus of the present embodiment acts to press a rice block received in the forming cylinder 84 and having wasabi paste applied thereon as desired to form the block into a firm oval-shape. The pressing mechanism 144, as shown in FIGS. 2 and 18, includes a driving rod 168 mounted with respect to the casing 14 so as to be vertically movable and connected through an intermittent actuation means 170 to the driving source 94 for the turntable 80. In the illustrated embodiment, the above-mentioned vertically moving arm 142 of the wasabi application mechanism 130, as shown in FIG. 1, is connected to the driving rod 168 so as to be moved in synchronism with the vertical movement of the driving rod 168. The pressing mechanism 144 also includes a pressing means 172 connected through the arm 142 to the driving rod 168. The pressing means 172 comprises a connection rod 174 connected to the arm 142 and a pressing member 176 mounted at the lower end of the rod 174 so as to face the forming cylinder 84. The pressing mechanism 144 further includes a lifting means 178, which comprises a seesaw plate 180 mounted on a pair of supporting members 182 so as to be pivotally rotated about a pin 184 and a push bar 186 supported at the lower end thereof on the seesaw plate 180 and connected at the upper end thereof to the arm 142, as shown in FIGS. 18 and 19. The seesaw plate 180 is connected at one end 188 thereof to the circular guide path 128 of the turntable mechanism 80 and forms a part of the guide path 128. The seesaw plate 180 may be connected to the path 128 by fitting the end 188 of the plate 180 in a recess 190 formed on a part of the path 128 as shown in FIG. 19. This allows the guide path to be flush with the end of the plate 180, resulting in the traveling roller 124 smoothly running on the path 128. In the illustrated embodiment, the end 188 of the seesaw plate 180 connected to the path is positioned right below the pressing member 176. Also, the push bar 186 is supported on the other end of the seesaw plate 180 opposite to the end 188 thereof.

The manner of operation of the pressing mechanism 144 in the present embodiment will be hereinafter described with reference to FIGS. 18 and 19.

When the turntable 80 is turned to allow one of the forming cylinders having a rice block received therein which has wasabi paste deposited thereon as desired and an ingredient put thereon to be positioned at a place shown in FIG. 18, the traveling roller 124 of the corresponding piston 122 is positioned on the end 188 of the seesaw plate 180. Then, the driving rod 168 is downwardly moved to allow the rice block having the ingredient put thereon to be vertically compressed by the pressing member 176 and the piston 122, so that it may be formed into oval-shaped sushi. More particularly, the pressing member 176 is downwardly moved through the arm 142 to be in close proximity to the bore 86 of the forming cylinder, to thereby downwardly compress the rice block. Whereas, the push bar 186 is also downwardly moved through the arm 142 to allow the seesaw plate 180 to be pivotally moved, so that the end 188 of the plate 180 upwardly pushes the piston 122 to permit the rice block to be effectively compressed between the pressing member 176 and the piston 122. The illustrated embodiment is adapted to adjustably set such compression force by mounting the connection rod 174 on the arm 142 so as to allow the former to be vertically adjustable with respect to the latter. Alternatively, such compression force may be adjusted by vertically adjustably mounting the push bar 186 on the arm 142 or using a coil spring instead of the push bar 186 to force the seesaw plate 180.

Then, the driving rod 168 is upwardly moved to allow the pressing member 176 to be away from the cylinder 84, and the push bar 186 is concurrently upwardly moved to be separated from the seesaw plate 180; so that the rod 168 and bar 186 may be returned to the positions shown in FIG. 18, respectively. At this time, the roller 124 of the piston is returned to the surface of the guide path 128. Subsequently, when the turntable 80 is intermittently turned in the direction indicated by the arrow in FIG. 1 to position the next cylinder 84 right below the pressing member 176 and stopped, the driving rod 168 is actuated again to repeat the pressing procedure as described above.

Figure 20:
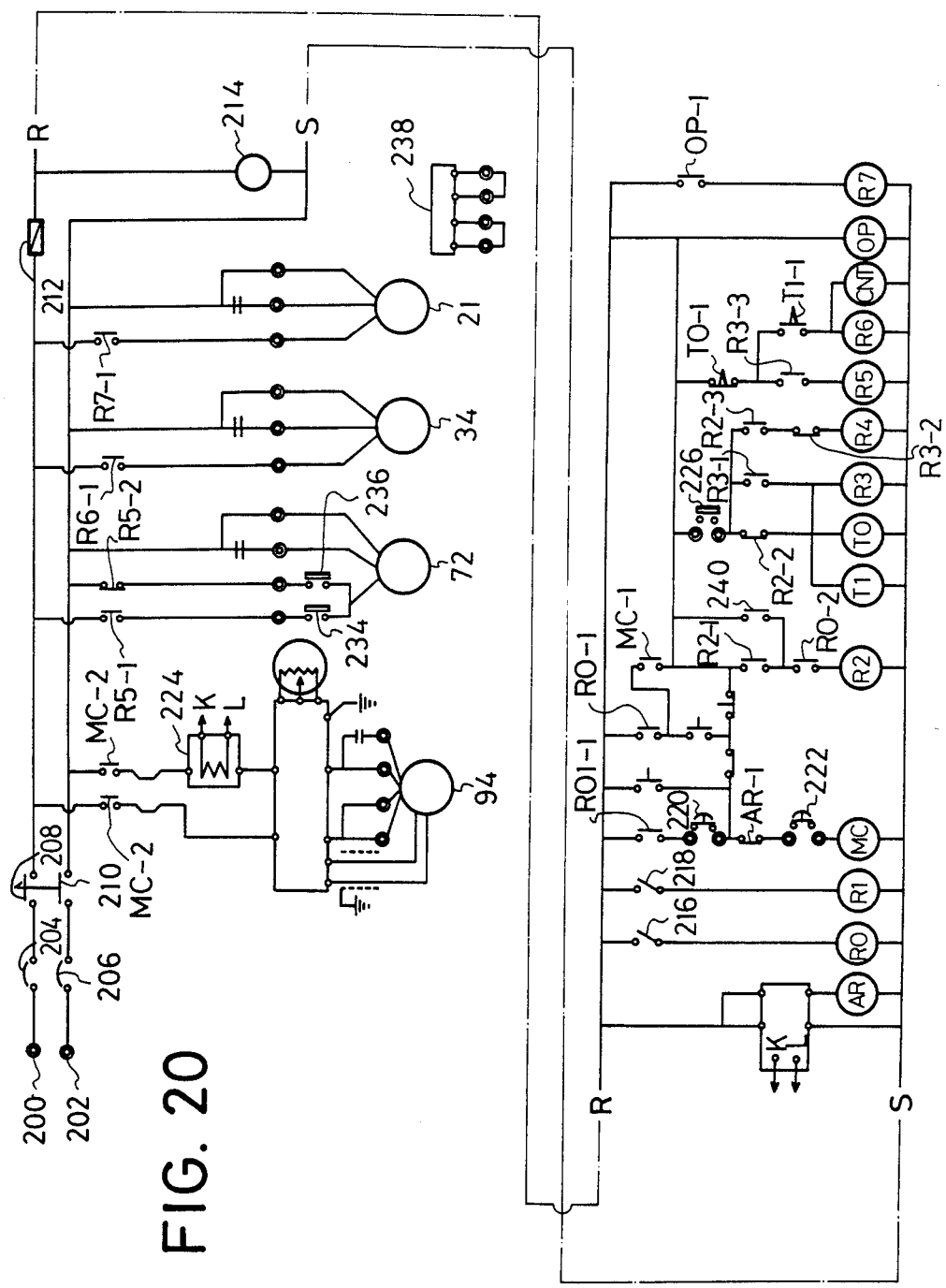
FIG. 20 is a circuit diagram showing a control mechanism in the apparatus of FIG. 1.

The food shaping apparatus 10 of the embodiment still further includes a control mechanism or control circuit detailedly shown in FIG. 20 which serves to allow the driving sources or motors 94, 34, 21 and 72 to be operated in this order.

In FIG. 20, reference numerals 200 and 202 designate an R-phase of an AC source and an S-phase thereof, respectively; and reference numerals 204 and 206 each designate a breaker for a wiring. 208 and 210 each indicate a change-over switch which is adapted to be closed by hand and automatically opened. Numeral 212 designates a fuse and 214 designates a lamp for confirming the input of a power source. The lamp 214 is turned on by closing the change-over switches 208 and 210.

Now, when boiled rice is charged in the hopper 12 and a manual switch 216 is closed, a magnetic coil RO is excited to close contacts RO-1 and RO-2. Then, when a manual switch 218 is closed, a magnetic coil R1 is excited to close a contact RO1-1. Switches 220 and 222 for emergency stop are kept closed and a contact AR-1 is closed because a magnetic coil AR is not excited. This allows a magnetic coil MC to be excited and contacts MC-1 and MC-2 to be closed to operate the motor 94, so that the turntable 80 starts to be turned.

When the motor 94 turns the turntable 80 for a predetermined period of time, a thermal over current relay 224 operates to excite the magnetic coil AR and open the contact AR-1 to release excitation of the magnetic coil MC. This results in the contacts MC-2 being opened to stop the motor 94, to thereby stop turning of the turntable 80. More particularly, the turntable 80 is stopped when it is turned for a period of time corresponding to the interval between the adjacent two forming cylinders 84 in the direction indicated by the arrow in FIG. 1 to allow the bore 86 of the cylinder 84 to be positioned right below the path 35 between the guide plates 24. When the contact C (FIG. 1) operates the micro-switch or limit switch MS at the position of stopping the turntable 80, a limit contact 226 is closed to allow timing exciting coils T1 and T0 and a magnetic coil R3 to be excited because of a magnetic coil R2 being de-energized to close a contact R2-2, to thereby close contacts R3-1 and R3-3 and open a contact R3-2.

Then, a contact T1-1 is closed in a predetermined period of time after the timing exciting coil T1 is excited. In the present embodiment, the contact T1-1 is closed in 0.4 sec. after excitation of the coil T1. Also, a contact T0-1 is opened in a predetermined period of time because the exciting coil T0 has been excited. In the embodiment, the contact T0-1 is opened in 0.8 sec.

Thus, until 0.4 sec. passes after the limit switch 226 has been closed, the contacts T0-1 and R3-3 are closed and the contact T1-1 is opened. Accordingly, a magnetic coil R5 is excited, whereas a magnetic coil R6 is not excited. At this time, a contact R5-1 is closed due to excitation of the magnetic coil R5.

Now, the manner of control of the driving motor 72 for the dividing mechanism 56 will be described with reference to FIGS. 8 and 20.

In FIG. 8, the dividing mechanism 56 is constructed in the manner that the eccentric hole 70 formed at the driving shaft 69 is rotated about a rotary shaft of the motor 72 to allow the pin 71 fitted in the eccentric hole 70 to pivotally move the actuating rods 64 about the pin 65 through the linkage 74, so that the cutter 58 starts to be actuated in a state of abutting the blades 60 against each other as shown in FIG. 8; and then the blades 60 are separated from each other a maximum distance when the motor 72 carries out half-rotation, and the blades return to the original abutting state shown in FIG. 8 when the motor accomplishes the remaining half-rotation. Further, the driving shaft 69 has the contact 228 fixedly connected thereto, which acts to alternately operate the limit switches 230 and 232 every half-rotation of the motor 72. In FIG. 8, the limit switch 230 is operated to close a contact 234 (FIG. 20); so that closing of the contact R5-1 due to excitation of the magnetic coil R5 allows the motor 72 to operate. Then, when the motor 72 carries out half-rotation, the cutter 58 is operated to separate the blades 60 from each other and the limit switches 230 and 232 are respectively released and operated. It takes the driving shaft 69 about 0.4 sec. to carry out half-rotation to operate the limit switch 232.

During the following 0.4 sec., the contacts T0-1 and R3-3 are closed to keep the magnetic coil R5 excited; whereas the magnetic coil R6 is excited because the contact T1-1 is closed in 0.4 sec. after the start, so that a contact R6-1 is closed to operate the motor 34. Thus, the conveyor belt 20 and the endless chain 36 are driven to allow boiled rice to be forcedly transferred through the path 35. At this time, the contact T5-1 is kept closed; however, the limit switch 230 is released to open the contact 234 to stop operation of the motor 72. Thus, the cutter 58 allows boiled rice to be discharged from the path 35 therethrough because the blades are kept open.

When 0.8 sec. passes after the start, the contact T0-1 is opened to release excitation of the magnetic coils R5 and R6; so that the contact R6-1 is opened to stop rotation of the endless chains 36. Also, the release of excitation of the magnetic coil R5 allows the contact R5-1 and a contact R5-2 to be respectively opened and closed. At this time, a contact 236 is closed to allow the motor 72 to carry out the operation; and when the motor 72 carries out half-rotation, the limit switches 232 and 230 are respectively released and operated to open the contact 236 to stop the motor. This results in the blades 60 of the cutter instantaneously abutting against each other as shown in FIG. 8 to cut boiled rice passing through the cutter.

The conveyor belt 20 of the hopper 12 is driven by operating control panel 238 in a manner of exciting a magnetic coil OP to close a contact OP-1 and exciting a magnetic coil R7 to close a contact R7-1 to operate the motor 21, to thereby drive the conveyor belt 20.

When a predetermined period of time passes after stop of the motor 92 for the turntable 80, the thermal over current relay 224 does not operate; thus, excitation of the magnetic coil AR is released to close the contact AR-1 to re-excite the magnetic coil MC. This allows the contacts MC-2 to be re-closed to operate the motor 92, to thereby turn the turntable again.

Rotation of the turntable 80 in the direction indicated by the arrow in FIG. 1 allows the contact C provided at the turntable 80 to be separated from the switch MS to release the switch, to thereby cause excitation of the timing exciting coils T1 and T0 and excitation of the magnetic coil R3 and a magnetic coil R4 to be released; whereas the magnetic coils R5 and R6 are not excited because the contacts R3-3 and T1-1 are opened. Thus, it will be noted that the cutter 58 and endless chain 36 are not driven while the turntable 80 is turning. When the conveyor belt is adapted to be driven by the magnetic coil R6, the conveyor belt is not turned as well.

Then, a succeeding empty cylinder 84 is positioned right below the path 58 of the transfer mechanism 22. Motors 34 and 72 are operated in the manner as described above the allow a rice block of a fixed quantity divided by the cutter 58 to be received in the empty cylinder, and then the turntable is turned again. Thus, the procedure described above is repeated in the same manner.

In the embodiment, when the switch 240 is closed by hand, the magnetic coil R2 is excited because the contacts R0-1, MC-1 and R0-2 are closed; and the magnetic coil R2 is kept excited even when the contact R2-1 is closed to cause a switch 240 to automatically return. Thus, because the contact R2-2 is opened and the contacts R2-3 and R3-2 are closed, the magnetic coil R4 is excited to open the contact R4-1.

In such state, when the contact C of the turntable contacts with the switch MS to operate the switch to close the contact, the timing exciting coils T1 and T0 and magnetic coil R3 are kept in a state released from excitation because the contact R2-2 is opened. Therefore, the contact T0-1 is closed and the contact R3-3 is opened, so that the magnetic coil R5 is not excited; whereas the magnetic coil R6 is not excited as well, because the contact T1-1 is opened. Thus, the cutter 58 and endless chain 36 are not operated because the contacts R5-1 and R6-1 are opened.

Accordingly, turn-on of the switch 240 allows the cutter 58 and endless chain 36 to be stopped and keeps the cutter and endless chain in a stopped state even when the turntable is stopped. However, the contact MC-1 is opened to release excitation of the magnetic coil R2 while the turntable is stopped, resulting in the cutter and endless chain being driven when the turntable is further rotated and stopped.

Rice blocks formed by the cutter and received in the cylinders are carried to the pressing mechanism 144 by intermittent rotation of the turntable to be formed into oval-shaped sushi. If desired, the rice blocks are subjected to a wasabi application procedure utilizing the wasabi application mechanism 130.

Now, the manner of operation of the food shaping apparatus 10 will be hereinafter described with reference to the drawings.

When the hopper 12 is charged with boiled rice and the power supply is started, the turntable 80 is turned a distance corresponding to the interval between the adjacent two forming cylinders 84 in the direction indicated by the arrow in FIG. 1 to allow one of the cylinders to be positioned right below the path 35 of the transfer mechanism 22 and is stopped. When the turntable 80 is stopped, the conveyor belt 20 and traveling members 30 are respectively operated by the motors 21 and 34 to discharge boiled rice to the path 35. At this time, the blades 60 of the cutter 58 are kept separate from each other as shown in FIG. 1 for a predetermined short period of time to allow a fixed quantity of boiled rice to be received in the cylinder and then closed. Then, the turntable 80 is again turned a predetermined distance in the direction indicated by the arrow, during which the motors 21 and 34 are stopped to stop operation of the conveyor belt 20 and traveling members 30. Whereas, the cylinder 84 having boiled rice received therein is transferred with rotation of the turntable 80, and the succeeding forming cylinder 84 is positioned right below the path and kept at the position for a predetermined period of time, during which a fixed quantity of boiled rice is received in the cylinder.

Such intermittent rotation of the turntable 80 is repeated to receive a fixed quantity of boiled rice in the following cylinders 84 and to transfer the cylinders filled with rice to the pressing mechanism, during which an ingredient such as a fillet of fish or shellfish is put on rice in each cylinder by hand or any suitable means. When the cylinder filled with rice having an ingredient put thereon is transferred to the position shown in FIG. 18, the roller 124 of the piston 122 is positioned on the end 188 of the seesaw plate 180. Then, the driving rod 168 is downwardly moved to vertically compress the rice and ingredient received in the cylinder to form stable oval-shaped sushi. If desired, a wasabi application operation may be carried out prior to the pressing operation by the application mechanism 130 which is operated in synchronism with the pressing mechanism 144. The so-prepared oval-shape sushi is removed by hand or other suitable means (not shown) after it leaves the pressing mechanism 144.

As can be seen from the foregoing, the food shaping apparatus of the present invention is capable of smoothly carrying boiled rice from the hopper to the dividing mechanism under adequate compression while preventing rice from falling by gravity and the path from being clogged with rice. Also, the present invention can precisely divide boiled rice to prepare rice blocks of a substantially fixed quantity at a fixed position even when the boiled rice has significantly high viscosity, so that the rice blocks may be effectively received in the cylinders of the turntable. In addition, the present invention can readily form a shaped food different in size and/or configuration and easily clean the forming cylinders without removing the turntable from the apparatus.

Further, it will be noted that the present invention can readily form a rice block into a desired stable shape while controlling pressure applied to the rice block and firmly holding an ingredient on the rice block. Furthermore, the present invention can precisely control the mutual actions among the transfer mechanism, dividing mechanism and turntable to form even finished food. Still further, if desired, the present invention can automatically successively apply an additive such as wasabi to a rice block received in the cylinder.

Obviously many modifications and variations of the present invention are possible in the light of the above teachings. It is therefore to be understood that within the scope of the appended claims the invention may be practiced otherwise than as specifically described.

What is claimed is:

1. A food shaping apparatus comprising:
   a hopper adapted to be charged with a food material and having a delivery means provided therein which acts to carry said food material to an outlet of said hopper;
   a transfer mechanism for downwardly transferring said food material discharged from said outlet of said hopper, said transfer mechanism being arranged adjacent to said outlet of said hopper and including a pair of carrying means which are vertically arranged opposite to each other to define a path therebetween to forcedly transfer said food material through said path;
   a dividing mechanism for dividing said food material to prepare food material blocks of a substantially fixed quantity, said dividing mechanism comprising a cutter having a pair of blades arranged in proximity to the lower end of said carrying means and a cutter actuating means for allowing said blades to abut against each other or contactingly cross each other right below the central portion of said path; and
   a control mechanism for intermittently driving said transfer mechanism and alternately actuating said transfer mechanism and said dividing mechanism.

2. A food shaping apparatus as defined in claim 1, wherein said transfer mechanism comprises a pair of endless belts vertically arranged opposite to each other to define a gap therebetween and a roller means for supporting and driving said endless belts, said gap comprising an upper portion positioned adjacent to said outlet of said hopper to receive therein said food material discharged from said outlet and a middle to lower portion forming said path for carrying said food material while compressing.

3. A food shaping apparatus as defined in claim 2, wherein said transfer mechanism and said delivery means of said hopper are connected to a common driving source, said control mechanism operating said driving source to allow said transfer mechanism and said delivery means to be driven substantially in synchronism with each other.

4. A food shaping apparatus as defined in claim 2, wherein said endless belts are arranged to be laterally shiftable.

5. A food shaping apparatus as defined in claim 1, wherein said transfer mechanism comprises:
   a pair of vertically extending guide plates arranged opposite to each other to define at least said path therebetween, said guide plates each having at least one slit formed in the longitudinal direction thereof;
   an endless traveling member arranged to travel along the outer surface of each of said guide plates; and
   a plurality of guide pins fixed at suitable intervals on said endless traveling member so as to outwardly extend therefrom, said guide pins being adapted to have access to said slit of said guide plate.

6. A food shaping apparatus as defined in claim 5, wherein said delivery means of said hopper and said transfer mechanism are respectively connected to driving sources provided separate from each other, said control mechanism operating said driving sources to allow said transfer mechanism and said hopper to be driven substantially in synchronism with each other.

7. A food shaping apparatus as defined in claim 5, wherein said endless traveling member comprises a chain.

8. A food shaping apparatus as defined in claim 5, wherein said guide pins are arranged in one row.

9. A food shaping apparatus as defined in claim 5, wherein said guide pins of each guide plate are arranged in plural rows and said slit of each guide plate is formed corresponding in number to rows of said guide pins.

10. A food shaping apparatus as defined in claim 1 further comprising a turntable controlled to be horizontally intermittently turned by said control mechanism, said turntable comprising a turntable body having a plurality of holes forced therethrough and arranged in a circle and forming cylinders formed with bores for forming said food material blocks and detachably fitted in said holes of said turntable body.

11. A food shaping apparatus as defined in claim 10, wherein said turntable body consists of an upper flat plate member and a lower member comprising a reinforcing rib.

12. A food shaping apparatus as defined in claim 10, wherein said turntable body is formed of lightweight metal.

13. A food shaping apparatus as defined in claim 10, wherein said cylinders each are formed of fluoroplastic.

14. A food shaping apparatus as defined in claim 10, wherein said cylinders each are coated at the inner wall thereof defining said bore with fluoroplastic.

15. A food shaping apparatus as defined in claim 1 further comprising a pressing mechanism for pressingly forming said food material block, said pressing mechanism comprising:
   a piston vertically movably fitted in each of forming cylinders arranged in a circle on a turntable intermittently driven by said control mechanism;
   a piston guiding means for allowing said piston to accomplish predetermined vertical movement during one intermittent rotation of said turntable;

a lifting means for upwardly moving said piston to disengage said piston from said guide means;
a pressing means for pressing said food material corresponding to said operation of said lifting means; and
an intermittent actuation means for operating said lifting means and said pressing means in synchronism with each other while said turntable is stopped during the intermittent rotation.

16. A food shaping apparatus as defined in claim 15, wherein said piston guiding means comprises a circular guide path arranged opposite to the lower surface of said turntable, and said lifting means includes an element vertically movably supported on said guide path and forming a part of said guide path.

17. A food shaping apparatus as defined in claim 15, wherein said intermittent actuation means comprises a vertically movable driving rod and a connection rod fixed to said driving rod, and said lifting means and said pressing means are connected to said connection rod.

18. A food shaping apparatus as defined in claim 15, wherein said turntable and said intermittent actuation means are driven in phases different from each other by a common driving source operated by said control mechanism.

19. A food shaping apparatus as defined in claim 1 further comprising an additive supply mechanism for supplying an additive to said food material, said additive supply mechanism comprising:
an outlet means arranged above a turntable which has a plurality of forming cylinders arranged in a circle and is intermittently driven by a first driving means operated by said control mechanism;
a means for feeding said additive under pressure which is connected through a supply pipe to said outlet means; and
a vertically movable supporting member for supporting at least said outlet means, said supporting member being vertically intermittently moved by a second driving means operated by said control mechanism;
said feeding means being adapted to supply said additive to said outlet means when said outlet means is downwardly moved to a position adjacent to the upper surface of said turntable.

20. A food shaping apparatus as defined in claim 19, wherein said first and second driving means are driven in phases different from each other by a common driving source operated by said control mechanism.

21. A food shaping apparatus as defined in claim 19, wherein said second driving means is adapted to downwardly move said outlet means while said turntable is stopped during the intermittent operation.

22. A food shaping apparatus as defined in claim 19, wherein said feeding means comprises a constant feed section connected to one end of said supply pipe and an intermittent feed section provided at the intermediate portion of said supply pipe.

23. A food shaping apparatus as defined in claim 22, wherein said constant feed section comprises a cylindrical container having an opening formed at the upper portion thereof and a bottom portion to which said supply pipe is connected, and a piston-like pressure applying member slidably fitted in said container; and said intermittent feed section comprises a cylinder having a piston slidably received therein which has a piston rod downwardly projecting from said cylinder, and said cylinder being supported on said supporting member.

24. A food shaping apparatus as defined in claim 15 further comprising an additive supply mechanism for supplying an additive to said food material, said additive supply mechanism comprising:
an outlet means arranged above said turntable;
a means for feeding said additive to said outlet means under pressure which is connected through a supply pipe to said outlet means; and
a vertically movable supporting member for supporting at least said outlet means, said supporting member being connected to said intermittent actuation means of said pressing mechanism so as to be vertically intermittently moved;
said feeding means being adapted to supply said additive to said outlet means when said outlet means is downwardly moved to a position adjacent to said turntable.

25. A food shaping apparatus as defined in claim 24, wherein said turntable and said intermittent actuation means are driven in phases different from each other by a driving source controlled by said control mechanism.

26. A food shaping apparatus comprising:
a transfer mechanism for downwardly carrying a food material discharged from a hopper;
a dividing mechanism arranged in proximity to said transfer mechanism to divide said food material carried by said transfer mechanism;
a forming mechanism for shaping said food material while being intermittently moved;
driving sources for respectively driving said transfer mechanism, dividing mechanism and forming mechanism; and
a control mechanism for operating said respective driving sources so that said dividing mechanism and said transfer mechanism are alternately drivable only in this order every time when said forming mechanism is stopped during the intermittent operation.

27. A food shaping apparatus as defined in claim 26, wherein said forming mechanism comprises a turntable having a forming cylinder means for receiving said food material therein provided thereon.

28. A food shaping apparatus as defined in claim 26, wherein said control mechanism comprises a circuit which allows said forming mechanism to be intermittently moved by a relay; a circuit which allows said forming mechanism to be stopped by an overcurrent relay; and a circuit which alternately operates said driving source for said dividing mechanism and said driving source for said transfer mechanism in this order by a relay timing-controlled by a limit switch operated depending upon movement of said forming mechanism and a pair of limit switches alternately operated every rotation of a driving shaft of said dividing mechanism, every time when said forming mechanism is stopped during the intermittent operation.

29. A food shaping apparatus as defined in claim 26, wherein said transfer mechanism comprises an endless chain having feed pins fixed thereon and a driving means therefor.

30. A food shaping apparatus as defined in claim 26, wherein said transfer mechanism comprises a pair of endless belts and a driving means therefor.

31. A food shaping apparatus comprising:
a hopper adapted to be charged with a food material and having a delivery means provided therein which acts to carry said food material to an outlet of said hopper;
a transfer mechanism for downwardly transferring said food material discharged from said outlet of said hopper, said transfer mechanism being disposed below said outlet of said hopper and including a pair of carrying means which are vertically arranged opposite to each other to define a path therebetween to forcedly transfer said food material through said path;

a dividing mechanism for dividing said food material, which comprises a cutter having a pair of blades arranged in proximity to the lower end of said carrying means and a cutter actuating means for allowing said blades to abut against each other or contactingly cross each other right below the central portion of said path;

a turntable adapted to be intermittently driven and comprising a turntable body having a plurality of holes formed therethrough and arranged in a circle and forming cylinders formed with bores for receiving and forming said food material and detachably fitted in said holes of said turntable;

a pressing mechanism comprising a piston slidably fitted in each of said forming cylinders of said turntable, a piston guiding means which acts to allow said piston to accomplish predetermined vertical movement during one rotation of said turntable, a lifting means for vertically moving said piston to disengage said piston from said guiding means, a pressing means for downwardly pressing said food material corresponding to said operation of said lifting means, and an intermittent actuation means for operating said lifting means and said pressing means in synchronism with each other while said turntable is stopped during the intermittent operation;

a driving source for said hopper, a driving source for said transfer mechanism, a driving source for said dividing mechanism, and a driving source common to said turntable and said intermittent actuation means of said pressing mechanism; and a control mechanism for operating said driving sources to allow said dividing mechanism and said transfer mechanism to be alternately driven in this order and allow said delivery means and said dividing mechanism to be driven substantially in synchronism with each other every time when said turntable is stopped during the intermittent operation, and also allow said turntable and said intermittent actuation means of said pressing mechanism to be driven in phases different from each other.

* * * * *